United States Patent
Amar (10) Patent No.: US 10,373,282 B2
(45) Date of Patent: Aug. 6, 2019

(54) METHOD AND SYSTEM FOR CONTROLLING DISPLAY PARAMETERS THROUGH MULTIPLE PIPELINES

(71) Applicant: Samsung Electronics Co., Ltd., Suwon-si, Gyeonggi-do (KR)

(72) Inventor: Srivastava Amar, New Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 14/534,676

(22) Filed: Nov. 6, 2014

(65) Prior Publication Data

US 2015/0138210 A1 May 21, 2015

(30) Foreign Application Priority Data

Nov. 18, 2013 (IN) ............................ 5302/CHE/2013
Aug. 5, 2014 (KR) ........................ 10-2014-0100703

(51) Int. Cl.
*G06T 1/20* (2006.01)
*G06F 3/14* (2006.01)
*G06F 3/147* (2006.01)

(52) U.S. Cl.
CPC ................ *G06T 1/20* (2013.01); *G06F 3/147* (2013.01); *G06F 3/1423* (2013.01); *G06F 3/1446* (2013.01)

(58) Field of Classification Search
CPC ....... G06T 1/20; G06F 3/1423; G06F 3/1446; G06F 3/147; G09G 2300/026
USPC ................................................. 345/506, 1.1
See application file for complete search history.

(56) References Cited

U.S. PATENT DOCUMENTS

| | | | |
|---|---|---|---|
| 6,628,243 B1 * | 9/2003 | Lyons | G06F 3/1431 345/1.1 |
| 7,734,835 B2 | 6/2010 | Jo et al. | |
| 7,911,475 B2 * | 3/2011 | Noorbakhsh | G09G 5/006 345/543 |
| 8,319,757 B2 | 11/2012 | Choi | |
| 9,424,586 B1 * | 8/2016 | Sivertsen | G06Q 30/0241 |
| 9,626,684 B2 * | 4/2017 | Angell | G06Q 30/02 |
| 2003/0164831 A1 * | 9/2003 | Walls | G06F 15/8053 345/505 |

(Continued)

FOREIGN PATENT DOCUMENTS

| JP | 2009-169885 A | 7/2009 |
|---|---|---|
| KR | 10-2006-0059354 A | 6/2006 |
| WO | 2011/017470 A1 | 2/2011 |

OTHER PUBLICATIONS

Using the Low-Level Monitor Configuration Functions, Feb. 3, 2012, Microsoft.

*Primary Examiner* — Jacinta M Crawford
(74) *Attorney, Agent, or Firm* — Jefferson IP Law, LLP (57) ABSTRACT

A method and a system for controlling display parameters through multiple inter-integrated circuit (I2C) pipelines are provided. The method includes creating the multiple I2C pipelines to control the display parameters in one or more of the display devices. The method also includes sending control data to graphic cards associated with one or more display devices through the multiple I2C pipelines. Further, the method includes forwarding the control data from the graphic cards to the associated one or more display devices. Additionally, the method includes applying the display parameters automatically based on the control data.

11 Claims, 6 Drawing Sheets

(56) References Cited

U.S. PATENT DOCUMENTS

| | | | |
|---|---|---|---|
| 2005/0165989 A1 | 7/2005 | Kim | |
| 2008/0246781 A1* | 10/2008 | Surati | H04N 5/74 345/690 |
| 2009/0160731 A1* | 6/2009 | Schuler | G06F 3/1423 345/1.1 |
| 2009/0160878 A1* | 6/2009 | Kwong | G09G 5/00 345/690 |
| 2011/0140991 A1 | 6/2011 | Brenneman et al. | |
| 2011/0309999 A1* | 12/2011 | Chang | G03B 21/13 345/1.1 |
| 2012/0080532 A1* | 4/2012 | Tai | G05D 23/1919 236/49.3 |
| 2013/0147817 A1* | 6/2013 | Carter | G06F 1/10 345/506 |

* cited by examiner

METHOD AND SYSTEM FOR CONTROLLING DISPLAY PARAMETERS THROUGH MULTIPLE PIPELINES

CROSS-REFERENCE TO RELATED APPLICATION(S)

This application claims the benefit under 35 U.S.C. § 119(a) of an Indian patent application filed on Nov. 18, 2013 in the Indian Intellectual Property Office and assigned Serial number 5302/CHE/2013, and a Korean patent application filed on Aug. 5, 2014 in the Korean Intellectual Property Office and assigned Serial number 10-2014-0100703, the entire disclosure of each of which is hereby incorporated by reference.

TECHNICAL FIELD

The present disclosure relates to a display apparatus. More particularly, the present disclosure relates to controlling display parameters of display devices through multiple pipelines.

BACKGROUND

Digital signage is booming with ever increasingly sized displays and video walls. Digital signage is often located in outdoor places and is heavily utilized in retail stores, malls, hotels, restaurants, corporate buildings, education sectors and airports. Rotating signage devices are also becoming popular. Consequently, a large number of users will be able to view digital content at any given point of time. The digital content includes, but is not limited to advertisements, television programming, menus and other informative messages.

To obtain the best viewing experience and the best picture quality the displays are required to be tuned to specific display parameters. Further, digital signages that are located in outdoor places are subjected to different atmospheric conditions, like brightness, contrast and colors. In such cases, tuning of the displays becomes obligatory.

In the related art, the displays are manually tuned. However, this manual tuning becomes difficult for large displays that are out of user control. A further technique involves tuning the display parameter only once over a certain period of time. To display contents efficiently, digital signage and large displays are to be calibrated continuously. Moreover, at times, digital signage needs to be calibrated for a particular amount of time. For example, a flash could appear in an advertisement after thirty seconds. As a result, tuning is required while the flash appears. However, existing technologies have not been successful to overcome the demands of automatically tuning digital signage for a specific period of time.

Manual tuning of digital signage and large displays is overly complex in a cloud environment where a number of digital signages are connected to a main server.

Further, fast access time is required for calibration in several circumstances. The circumstances could engage a single display or multiple displays. However, with existing technologies, achieving fast access time still remains a challenge.

In light of the foregoing discussion, there is a need for an efficient method and system that automatically controls display parameters in a single display device and in a plurality display devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for controlling display parameters through multiple inter-integrated circuit (I2C) pipelines.

In accordance with an aspect of the present disclosure, a method to control display parameters through multiple I2C pipelines is provided. The method includes creating the multiple I2C pipelines to control the display parameters in one or more of the display devices, sending control data to graphic cards associated with the one or more display devices through the multiple I2C pipelines, forwarding the control data from the graphic cards to the associated one or more display devices, and applying the display parameters automatically based on the control data.

In accordance with another aspect of the present disclosure, a method for controlling display parameters through multiple I2C pipelines is provided. The method includes creating the multiple I2C pipelines to control the display parameters in one or more of the display devices, calculating the display parameters for display devices, of the one or more display devices, that require calibration based on a surrounding atmosphere, forwarding the calculated display parameters through the multiple I2C pipelines to the display devices of the one or more display devices, and calibrating the display devices of the one or more display devices automatically with the calculated display parameters for a specified period of time.

In accordance with another aspect of the present disclosure, a system for controlling display parameters through multiple I2C pipelines is provided. The system includes a plurality of display devices, a memory configured to store multiple instructions, a processor coupled to the memory and configured to hold multiple I2C pipelines to process the multiple instructions consecutively, a cloud display management server configured to control the display parameters through the multiple I2C pipelines, and a main streaming server configured to render multimedia data to the plurality of display devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 6, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Various embodiments of the present disclosure described herein provide a method and system for controlling display parameters through multiple pipelines. For example, when a surrounding atmosphere of a display device changes, the display device is calibrated accordingly, in order to stream quality media content to users.

Figure 1:
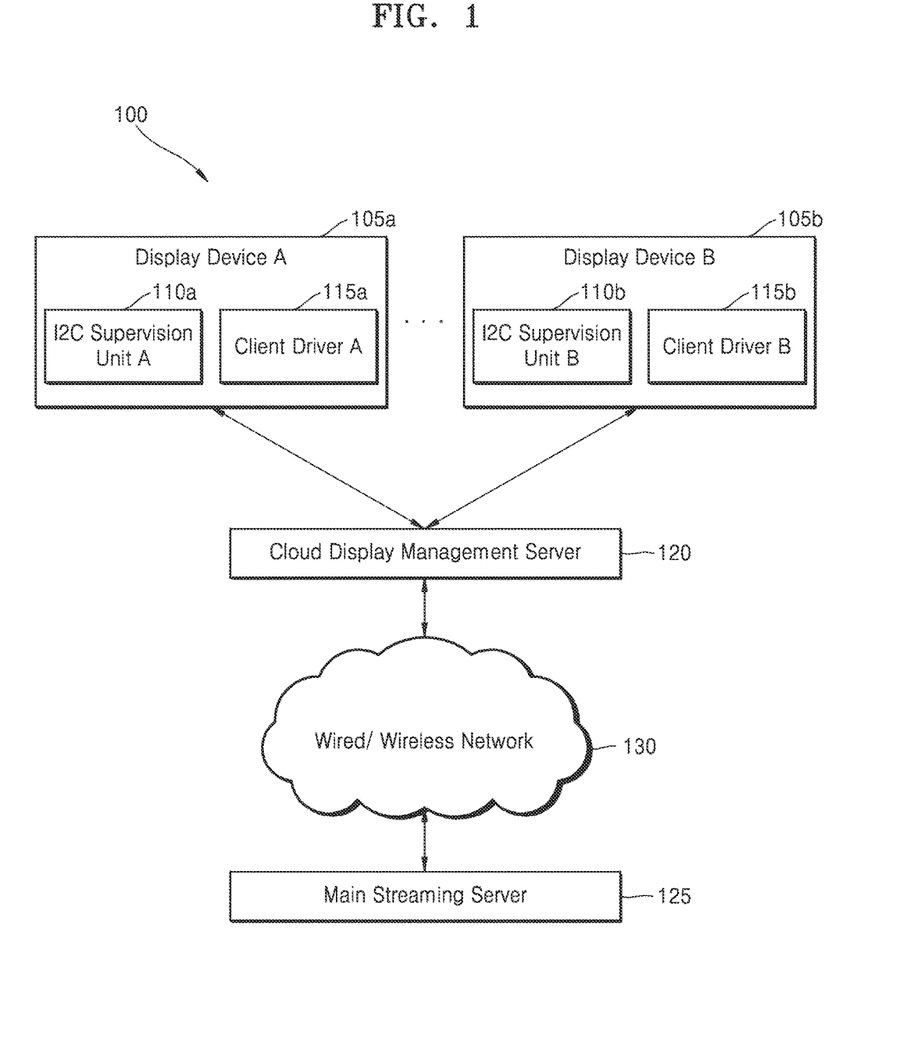
FIG. 1 is a block diagram of an environment according to an embodiment of the present disclosure.

FIG. 1 is a block diagram of an environment according to an embodiment of the present disclosure.

Referring to FIG. 1, an environment 100 is illustrated, where the environment 100 includes a plurality of display devices, for example a display device 105a and a display device 105b. The display devices may be connected in a cloud environment. The display devices further include I2C supervision units, for example I2C supervision unit A 110a and I2C supervision unit B 110b. Further, the display devices are installed with individual client drivers, for example client driver A 115a and client driver B 115b. The client driver is used to process a list of commands (instructions) for a specific period of time. The I2C supervision units are responsible for creating multiple I2C pipelines for I2C read and write modules. Typically, multiple pipelines cater to multiple display devices on a cloud simultaneously. The I2C read and write modules are responsible for writing parameter settings and reading specific parameter settings from the display devices. Consequently, faster access to I2C lines is achieved to control display parameters of display devices in the cloud. Typically, the I2C supervision units perform various functions like writing I2C values, reading I2C values, verifying writing operations and scheduling parameter settings for a particular time. Subsequently, results obtained are sent to a cloud display management server 120. The client drivers are installed in the display devices only when the display devices hold processing capability. Alternatively, the client drivers are located in the cloud display management server 120.

The environment 100 further includes the cloud display management server 120 and a main streaming server 125 connected over a network 130, such as the internet. The main streaming server 125 is used to render audio and video data to the display devices. Examples of the display devices include, but are not limited to in-house units, outdoor units, digital signage devices, rotating signage devices, big displays, video walls and thin clients. The display devices display television programming, menus, information, advertising and other informative messages to users.

Typically, a large number of the display devices are located in outdoor places intended for a number of users to view at any point of time. On the other hand, the display devices are further utilized in retail stores, hotels, restaurants, corporate buildings, education sector and airports. The client driver A 115a is used to process a list of commands for a specific period of time. In various embodiments, the client driver A 115a is installed in the cloud display management server 120. The plurality of display devices communicates with the cloud display management server 120 over the network 130 via the main streaming server 125. The network 130 is one of a wired network and a wireless network.

Figure 2:
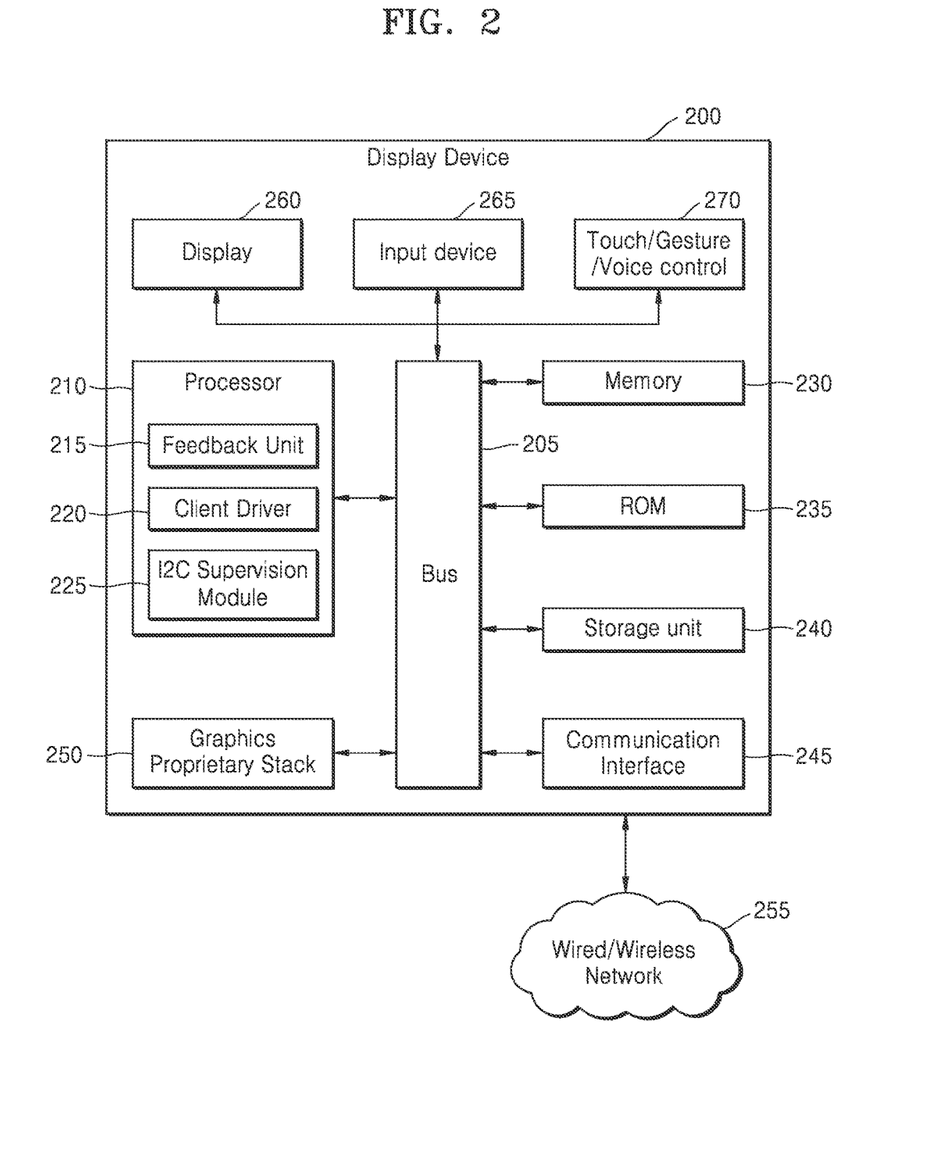
FIG. 2 is a block diagram of a display device according to an embodiment of the present disclosure.

FIG. 2 is a block diagram of a display device according to an embodiment of the present disclosure.

Referring to FIG. 2, a display device 200 is illustrated, where the display device 200 includes a bus 205 or other communication mechanism for communicating information. The display device 200 includes a processor 210 coupled with the bus 205. The processor 210 includes a feedback unit 215, a client driver 220 and an I2C supervision module 225. The feedback unit 215 obtains display quality of the display device 200. In various embodiments, the feedback unit 215 can be located as an external device. Further, the client driver 220 is used to process a list of commands (instructions) for a specific period of time. The display device 200 also includes a memory 230, such as a random access memory (RAM) or other dynamic storage device, coupled to the bus 205 for storing information which can be used by the processor 210. The memory 230 can be used for storing any temporary information required. The display device 200 further includes a read only memory (ROM) 235 or other static storage device coupled to the bus 205 for storing static information for the processor 210. A storage unit 240, such as a magnetic disk or optical disk, is provided and coupled to the bus 205 for storing information.

Various embodiments of the present disclosure are related to the use of the display device 200 for implementing the techniques described herein. In one embodiment, the techniques are performed by the processor 210 using information included in the memory 230. The information can be read into the memory 230 from another machine-readable medium, such as the storage unit 240. The instructions are stored in the memory 230.

The term "machine-readable medium" as used herein refers to any medium that participates in providing data that causes a machine to operate in a specific fashion. In an embodiment implemented using the display device 200, various machine-readable mediums may be involved, for example, in providing information to the processor 210. The machine-readable medium can be a storage media. Storage media includes both non-volatile media and volatile media. Non-volatile media includes, for example, optical or magnetic disks, such as the storage unit 240. Volatile media includes dynamic memory, such as the memory 230. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a compact disc ROM (CD-ROM), any other optical medium, punch cards, paper tape, any other physical medium with patterns of holes, a RAM, a programmable read only memory (PROM), an erasable programmable read only memory (EPROM), a FLASH-EPROM, any other memory chip or cartridge. In another embodiment, the machine-readable medium can be a transmission media including coaxial cables, copper wire and fiber optics, including the wires that include the bus 205. Transmission media can also take the form of acoustic or light waves, such as those generated during radio-wave and infra-red data communications. The display device 200 also includes a communication interface 245 and a graphics proprietary stack 250 coupled to the bus 205. The communication interface 245 provides a two-way data communication coupling to a wired or wireless network 255. Further, the graphics proprietary stack 250 is responsible for various operating system (OS) specific operations such as, blitting, rendering, drawing and stereoscopic support. Each display device encloses a unique graphic card that is proprietary (for example, a Samsung large format display (LFD) can use a Nvidea™ graphics card, whereas a Dell™ LFD can use an ATI™ graphics card, and so on).

The display device 200 can be coupled via the bus 205 to a display 260, such as but not limited to a liquid crystal display (LCD), an LFD, a light emitting diode (LED) display or plasma, for displaying television programming, menus, information, advertising and other informative messages. An input device 265 is coupled to the bus 205 for communicating an input to the processor 210. The input device 265 can be included in the display device 200. Another type of user input device is a touch, gesture, or voice control 270, such as a swipe, pattern, and voice recognition or cursor direction keys for communicating the input to the processor 210 and for controlling cursor movement on the display 260. The input device 265 can also be included in the display 260, for example a touch screen.

The display device 200 is connected to the wired or wireless network 255. A wired network is one in which all components in the network are connected with network cables.

Figure 3:
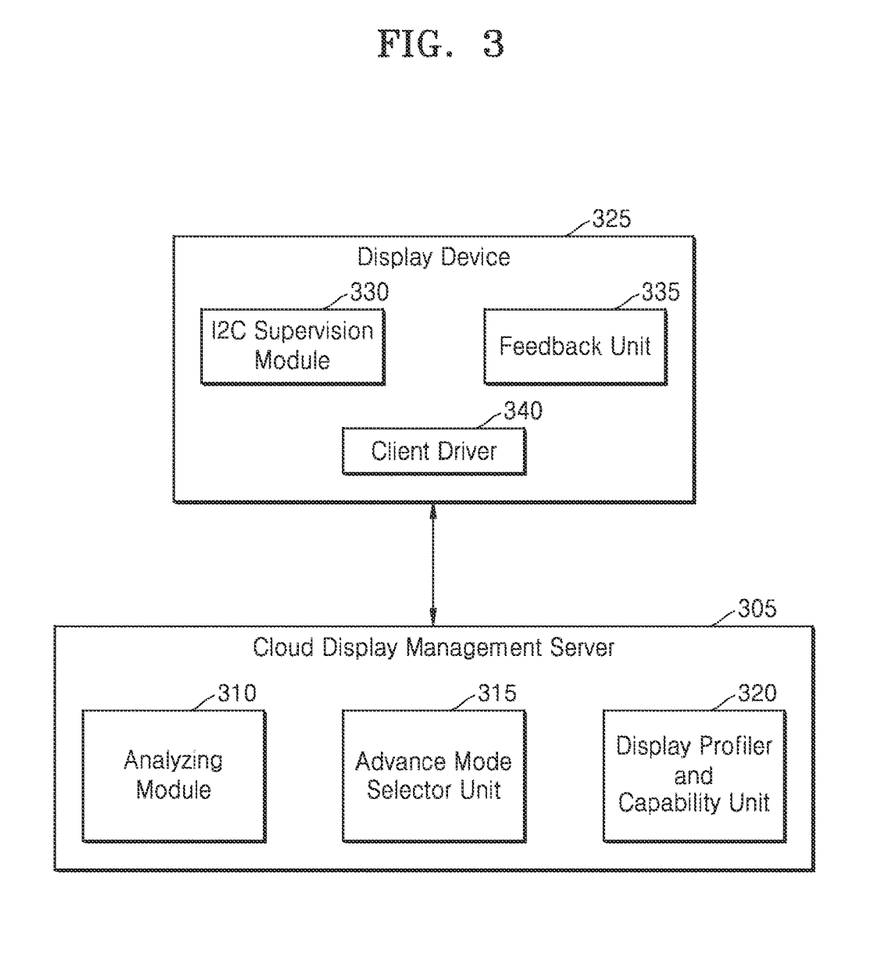
FIG. 3 illustrates a block diagram of a cloud display management server for controlling display parameters according to an embodiment of the present disclosure.

FIG. 3 illustrates a block diagram of a cloud display management server for controlling display parameters in a display device according to an embodiment of the present disclosure.

Referring to FIG. 3, a cloud display management server 305 is illustrated, where the cloud display management server 305 includes an analyzing module 310, an advance mode selector unit 315 and a display profiler and capability unit 320. The cloud display management server 305 is connected to a display device 325. The display device 325 includes an I2C supervision module 330, a feedback unit 335 and a client driver 340. In various embodiments, the client driver 340 is located in the cloud display management server 305 when the display device 325 fails to have processing capability.

The analyzing module 310 analyzes the capability matrix and the feedback to examine whether the display device requires calibration. Further, the analyzing module 310 performs necessary calculations to find out parameter settings to optimize the display device accordingly. In one embodiment, parameter settings are required to be calibrated for a specific period of time and for a specific section of display. In such a scenario, necessary calculations will be performed and resulting parameter settings are sent to corresponding display units in large display devices and video walls. Further, in various embodiments, parameter settings are required to be applied frequently to optimize a particular display device. In such cases, resulting parameter settings subsequent to the calculations are sent to the client driver 340 once and the client driver 340 is requested to apply the parameter settings whenever required.

The advance mode selector unit 315 selects a mode between the display device 325 and the cloud display management server 305. Examples of the mode include, but are not limited to, master transmit, master receive, slave transmit, and slave receive. The mode is subsequently established with the display device 325.

The display profiler and capability unit 320 is a database located within the cloud display management server 305 and extracts virtual control panel (VCP) capabilities of the display device 325. The capability matrix of the VCP capabilities is generated and is stored in the database. Typically, the VCP capabilities include a current display value, a maximum value and a code type for a display.

The I2C supervision module 330 is responsible for creating multiple I2C pipelines for I2C read and write modules as mentioned above. Further, display quality (feedback) for a specific period of time is obtained by the feedback unit 335. Subsequently, the feedback is sent to the cloud display management server 305.

Figure 4:
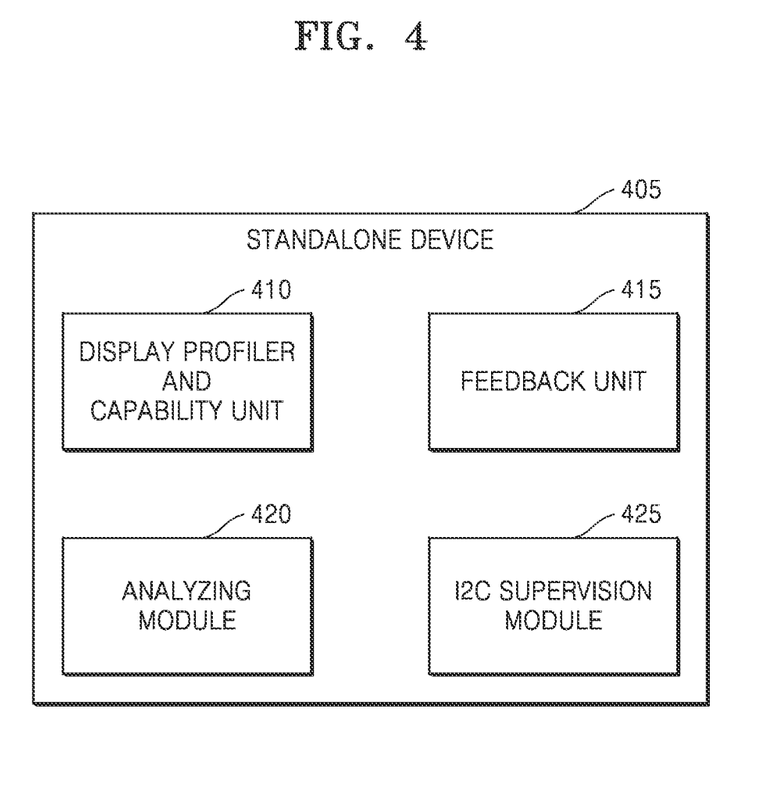
FIG. 4 illustrates a block diagram of a processor and a standalone device for controlling display parameters according to an embodiment of the present disclosure.

FIG. 4 illustrates a block diagram of a processor and a standalone device for controlling display parameters according to an embodiment of the present disclosure.

The features of the present disclosure can further be applied on standalone devices. All modules found in a client and server architecture are installed locally in standalone devices. Standalone devices include tablet personal computers (PCs), laptops, desktops, handheld computing devices, digital television (DTV), mobile phones, local PCs, LFDs and televisions.

Referring to FIG. 4, a standalone device 405 is illustrated, where the standalone device 405 includes a display profiler and capability unit 410, a feedback unit 415, an analyzing module 420 and an I2C supervision module 425. The display profiler and capability unit 410 extracts the display device capability of the standalone device 405. Further, current display settings of the standalone device 405 are retrieved from a database. The analyzing module 420 analyzes the display device capability and current display settings to calculate display parameters for calibration. Further, the I2C supervision module 425 writes the display parameters through a graphic vendor stack of the standalone device 405. Subsequently, a read operation is performed to verify the writing. As a result, display parameters of the standalone device 405 can be optimized using the features of the present disclosure.

Figure 5:
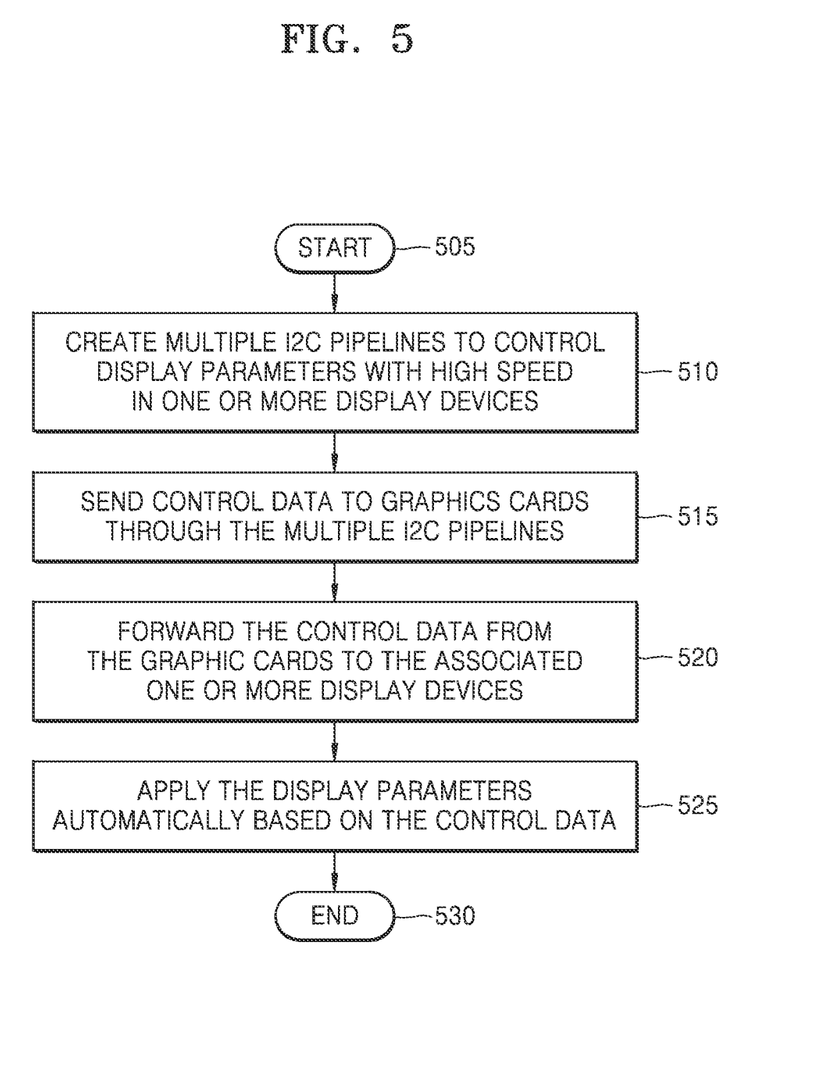
FIG. 5 illustrates a flowchart showing a multi-pipeline method of operation according to an embodiment of the present disclosure.

FIG. 5 illustrates a flowchart showing a multi-pipeline method of operation according to an embodiment of the present disclosure.

Referring to FIG. 5, a flowchart begins at operation 505. At operation 510, multiple I2C pipelines are created to control display parameters with high speed in display devices. The multiple I2C pipelines are created at the lowest layer in the kernel stack. Consequently, the multiple I2C pipelines interact directly and control the I2C pipelines thereby increasing processing speed. The I2C pipelines enable multiple chips to be connected to the same bus and each one can act as a master by initiating a data transfer.

Typically, multiple display devices are connected to a cloud display management server in a cloud environment. In such a scenario, each of the multiple display devices will utilize a separate pipeline. Hence, the multiple display devices are simultaneously processed.

At operation 515, control data is sent to graphics cards through the created multiple I2C pipelines. The control data includes values for adjusting (optimizing) display parameters. The control data is sent to I2C hardware on the graphics cards. The graphic cards (also referred to as video cards, video adapters, display cards, and/or graphics boards) are cards that generate and output images to a display.

The multiple I2C pipelines that are created are independent of graphic cards and manufacture type of the display devices.

At operation 520, the control data is forwarded from the graphic cards to the associated display devices. The display devices are connected to the graphics cards through a digital visual interface (DVI), a high-definition multimedia interface (HDMI), and a video graphics array (VGA) and so on.

Further, the control data is stored permanently with the display device until new values of control data are received.

At operation 525, the display devices are optimized according to the surrounding atmosphere. Based on the atmosphere, the display parameters are adjusted automatically with the control data. This provides a better viewing experience to the viewers.

Further, the method of operation is also used to optimize display devices with large monitors (e.g., LFDs) with high speed. In various embodiments, the proposed disclosure can be used in general scenarios to control display parameters for an application running on a computing device. The flowchart ends at operation 530.

Figure 6:
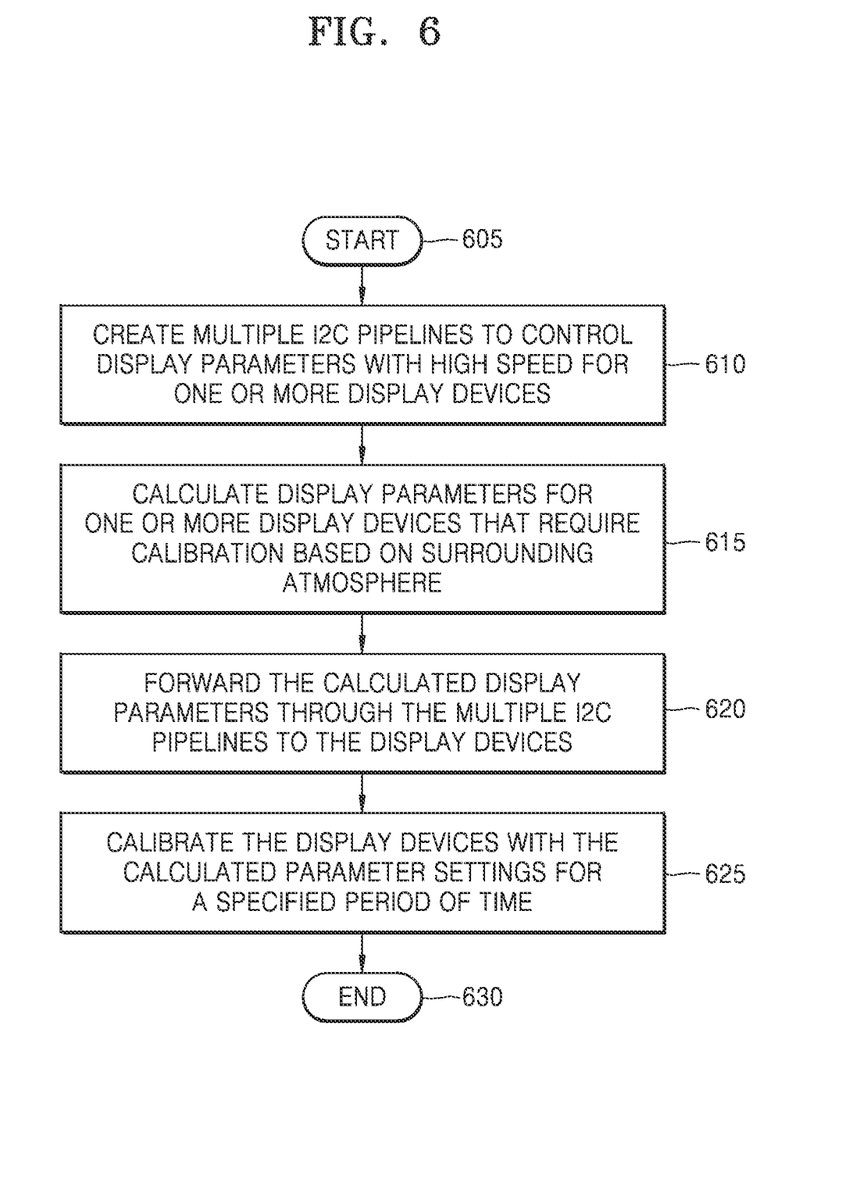
FIG. 6 illustrates a flowchart showing a method of operation according to an embodiment of the present disclosure.

FIG. 6 illustrates a flowchart showing a method of operation according to an embodiment of the present disclosure.

Referring to FIG. 6, a flowchart begins at operation 605. At operation 610, multiple I2C pipelines are created to control display parameters with high speed for one or more display devices as mentioned above.

A plurality of display devices are detected in a cloud environment. In some scenarios, a single standalone display device is detected. Display devices such as digital signage and video walls are typically located in outdoor places and are intended for viewing of a plurality of users. The display devices display television programming, menus, information, advertising and other informative messages. Further, the display devices need to be tuned for best viewing experience and for producing best picture quality. Consequently, display parameters like brightness, contrast colors, pure colors, gamma, hue, saturation, manufacturer specific features and display adaptiveness are to be tuned.

The display devices comprise VCP capabilities. The VCP capabilities of the display devices are extracted and a corresponding capability matrix is generated. Examples of the VCP capabilities includes, but is not limited to, a number of parameters, generic parameters supported by all manufacturers, manufacturer specific parameters and levels of parameter values corresponding to a specific display device.

Subsequent to detecting display devices, a mode is determined between the display devices and the cloud display management server. Examples of the mode include, but are not limited to, master transmit, master receive, slave transmit and slave receive. Further, profiles describing the modes are generated. Subsequently, a connection is established based on the modes between the display devices and the cloud display management server.

Further, the type of display in the display devices is identified and stored in a database. Every thin client or sub-display unit can have different types and models of display units.

At operation 615, display parameters are calculated for one or more display devices that require calibration based on surrounding atmosphere.

All display devices need to be tuned for a better viewing experience and for producing the best quality picture. Consequently, specific parameters settings for example, brightness, contrast and colors are tuned automatically at various occurrences of time. The current parameter settings signify the parameter settings at that particular point of time. Current parameter settings of the display devices are sent to a cloud display management server as feedback. Based on the feedback, the display devices can be continuously tuned.

At times, display devices that are located outdoors need to be calibrated according to the surrounding atmosphere. In cases of rotating display devices, the entire display device is divided into pixels and is further subjected to different lighting and weather conditions. In such cases, calibration is mandatory. Similarly, at times display devices needs to be calibrated dynamically for a specified period of time based on the media content displayed. Likewise, if videos run fast, different portions of the display device have to be tuned swiftly.

Further, video walls also require calibration. The video wall is made by merging small sub-displays and the media content is divided into chunks and transmitted to every sub-display, based on their position of the wall. The sub-displays face different surrounding conditions that require automatic calibration.

The cloud display management server subsequently analyzes the capability matrix and the current parameter settings to determine if the display devices require calibration based on the surrounding atmosphere. If the display devices require calibration, the required parameter settings values for calibration are calculated. The maximum values of these parameter settings obtained from the capability matrix are also considered during calculation.

At operation 620, the calculated display parameters are forwarded through the multiple I2C pipelines to the one or more display devices.

The multiple I2C pipelines are created for performing operations, also referred to as functions, on the display devices. Examples of the operations include, but are not limited to, writing, reading I2C values, verification of the writing and scheduling parameter settings for a particular period of time. At this point, the calculated parameter settings are written on a particular display device for calibration. Following writing, the calculated parameter settings are read. As a result, parameter settings are controlled through the multiple I2C pipelines.

At operation 625, the one or more display devices are calibrated with the calculated parameter settings for a specified period of time. As a result, the parameter settings are controlled automatically. The calculated parameter settings are also applied frequently on the specific display device.

Further, multimedia content is streamed to the display devices upon calibration.

The flowchart ends at operation 630.

Advantageously, the various embodiments specified in the present disclosure enable a multi-pipeline layer to control display parameters of display devices in a cloud environment. The proposed disclosure can be implemented in a cloud environment and can also be integrated on a stand-alone device. The main advantage of the proposed disclosure is that it automatically calibrates the display devices as per the surrounding atmosphere. Further, the proposed disclosure provides a time critical, uninterrupted job and is more efficient. In scenarios where video walls and a large number of display devices are used, a single server is utilized hence saving hardware cost.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling display parameters of a plurality of display devices by a server, the method comprising:
   receiving, by the server, display information comprising a surrounding condition and content information, from the plurality of display devices, the surrounding condition being an external condition of the plurality of display devices and the content information comprising a media content currently being reproduced on the plurality of display devices;
   identifying a type of display unit of each of the plurality of display devices;
   based on the received display information and the type of display unit of each of the plurality of display devices, determining, by the server, display devices that require calibration from among the plurality of display devices;
   calculating, by the server, the display parameters for adjusting image quality provided by display devices, of the determined display devices, that require calibration based on the display information and the type of the display unit;
   creating multiple inter-integrated circuit (I2C) pipelines for performing operations on the plurality of display devices, the operations including writing, reading interconnect circuit values, verifying the writing and scheduling parameter settings for a particular period of time; and
   controlling, by the server, to automatically calibrate the determined display devices that require calibration with the calculated display parameters by forwarding the calculated display parameters to the determined display devices that require calibration via the I2C pipelines.

2. The method as claimed in claim 1, further comprising:
   detecting the plurality of display devices in a cloud environment, the plurality of display devices including unique virtual control panel capabilities;
   extracting the virtual control panel capabilities from the plurality of display devices; and
   generating a capability matrix for the plurality of display devices.

3. The method as claimed in claim 2, wherein the calculating of the display parameters comprises:
   receiving current parameter settings of the plurality of display devices; and
   analyzing the capability matrix and the current parameter settings.

4. The method as claimed in claim 2, further comprising:
   streaming media content to the plurality of display devices subsequent to the calibrating of the display devices.

5. The method as claimed in claim 2, further comprising maintaining a database of the types of the display units of the plurality of display devices.

6. The method as claimed in claim 2, wherein the virtual control panel capabilities include a number of parameters, generic parameters supported by all manufacturers, manufacturer specific parameters and levels of parameter values corresponding to a specific display device.

7. The method as claimed in claim 2, further comprising:
   determining modes between each display device of the plurality of display devices and a cloud display management server;
   generating profiles for the modes; and
   establishing a connection based on the modes between each display device of the plurality of display devices and the cloud display management server.

8. The method as claimed in claim 1,
   wherein the creating of the multiple I2C pipelines comprises creating the multiple I2C pipelines to control the display parameters in the plurality of display devices, and
   wherein the method further comprises forwarding the calculated display parameters through the multiple I2C pipelines to the plurality of display devices.

9. The method as claimed in claim 1, further comprising:
   controlling to calibrate the plurality of display devices automatically with the forwarded display parameters for a specified period of time.

10. The method as claimed in claim 1, wherein the display parameters comprise information regarding adjusting at least one of brightness, contrast colors, hue, saturation, and manufacturer specific features.

11. The method as claimed in claim 1, wherein the content information further comprises a reproduction speed of the media content currently being reproduced.

* * * * *